June 23, 1970     M. K. MIRDADIAN     3,517,308

APPARATUS AND METHOD FOR TESTING ELECTRONIC COUNTING SYSTEMS

Filed Feb. 1, 1968     2 Sheets-Sheet 1

MOHAMMAD KIAN MIRDADIAN
INVENTOR

BY Arnold, Roylance,
Kruger & Durkee
ATTORNEYS

United States Patent Office

3,517,308
Patented June 23, 1970

3,517,308
APPARATUS AND METHOD FOR TESTING
ELECTRONIC COUNTING SYSTEMS
Mohammad Kian Mirdadian, 7020 Atwell St.,
Houston, Tex. 77036
Filed Feb. 1, 1968, Ser. No. 702,355
Int. Cl. G06f 11/00
U.S. Cl. 324—68                                    6 Claims

ABSTRACT OF THE DISCLOSURE

In one exemplar form, test apparatus is utilized for determining the accuracy and checking the performance of an electronic pulse transmission and counting system utilized in controlling, calibrating or metering fluid flowmeters. A repetitive series of electrical pulses of predetermined number generated by a rotary transducer are applied to the electronic pulse transmission and counting system. The series of predetermined number of pulses are spaced at sufficient time intervals to enable the registered pulses to be read from the counter for indicating the performance of the counting system prior to the registration of the next series of pulses.

---

This invention relates to methods and apparatus for testing the accuracy of electronic counters and counting systems and has particular reference to such methods and apparatus for self-checking the accuracy of performance of such counters and counting systems as they are employed to calibrate fluid flowmeters commonly used to measure the quantity of petroleum moved through pipelines.

BACKGROUND OF THE INVENTION

In the process of calibrating a flowmeter, or "meter proving" as it is often called, electronic counters and counting systems are commonly employed. The advantage of the electronic counting system lies in its accuracy and simplicity. The accuracy achieved with such a system is generally on the order of 1/1000 barrel. In calibrating a flowmeter, a number of test "runs" are conducted in which a calibrated volume of fluid is passed through the flowmeter. The runs are averaged and the readings for each run should fall within a predetermined tolerance from the average. If the readings for each run differ from the average by more than the accepted tolerance, then a malfunction of the flowmeter or counting system is indicated.

In a typical calibration setup, an electronic counting system often will contain a rotary transducer driven by the flowmeter, a counter to count the electrical pulses from the transducer and from 50 to 6000 feet of cable connecting the transducer and detector switches from a pipe prover to the counter. If the counter reading is not within the prescribed tolerance limits, the malfunction may be any of the following: improper gating of the transducer pulses, stray pulses induced in the connecting cables, improper functioning of the electronic counter, malfunction of the pulse generating transducer, malfunction of the flowmeter driving the transducer, or defective pipe prover detector switches.

It is desirable to eliminate the counting system as the malfunctioning source as quickly as possible. Several methods of system testing are presently utilized. A frequently used system employs a photoelectric rotary transducer driven by the flowmeter and producing 1000 pulses per revolution and a counter to count the generated pulses. The rotary transducer utilizes a contact closure or switch adapted to close once each revolution of the transducer and produce a gating signal. The counter contains a gating means to respond to the gating signal and alternately pass the flow of received pulses from the transducer to the counter during one transducer revolution and stop the flow of received pulses to the counter during the next transducer revolution.

The disadvantage of such a testing system lies in the fact that the gating means is generally associated with the counter circuitry and while the counter gating means is gated off during one revolution of the transducer, any stray pulses or transients induced in the transducer circuitry or the interconnecting cables from the transducer site to the counter will not be registered in the counter. In other words, the counter is gated off fifty percent of the test period, and any "extra" pulses will not be registered during that period.

Presently, with the above described type of system, two pairs of wires between the transducer and counter are needed in addition to the cable for transmitting the detector pulses from the pipe prover, thereby substantially increasing the number of connecting points that can cause a malfunction. Further, the great length of cable utilized greatly increases the chances of picking up transient electrical pulses.

To test the electronic counting system associated with turbine flowmeters during proving or in normal metering (since the turbine flowmeter does not have a built-in meter register) has presented serious problems. There is no mechanical linkage or take-off available to drive a rotary transducer. Further, since the flowmeter output pulse magnitude and frequency is a function of the fluid flow-rate through the meter, the test of the electronic counting system may not be valid unless the counter is tested utilizing pulses of the same magnitude and frequency. Since there is no access to the turbine rotor, gating the counter during testing to periodically check the registered number of counts against the predetermined number generated has presented another problem. Presently, there are no prior art counting systems that can satisfactorily accomplish the testing of turbine flowmeters.

SUMMARY OF THE INVENTION

These disadvantages of the prior art are overcome with the present invention, and novel methods and apparatus are provided herein for testing the performance of an electronic pulse transmission and counting system.

One embodiment of this invention utilizes a rotary transducer that repetitively generates a series of discrete electrical pulses of predetermined number during a first time period and does not generate any pulses during a second time period, and an electronic counter to count the pulses generated during the first time period. The second time period is of such a duration to cause a definite pause in the counting operation of the counter register. This pause is sufficiently long to be easily identified by the human eye so that the register reading can be obtained from the counter prior to the arrival of the next series of discrete pulses during the subsequently repeated first time period of the transducer. The need for a gating circuit to accomplish the counting system is eliminated, allowing the counter to count all pulses that are applied to its input whether they are generated by the rotary transducer, induced by stray pulses or some malfunction of the system.

Another embodiment utilizes a comparing and adjusting circuit to compare the frequency and magnitude of the pulses generated by a test transducer with the frequency and magnitude of the pulse output of a turbine flowmeter, and to allow adjustment of the transducer output to coincide with the output of turbine flowmeter. The adjusted output of the transducer is then used to test the counting system with the frequency and magnitude parameters of the turbine flowmeter for a particular fluid flow-rate.

Accordingly, it is one feature of the present invention to provide apparatus for testing electronic counting systems in which the counter is not gated off during the test period enabling all pulses induced in the cabling or produced by a malfunction to be registered.

Another feature of the present invention is to provide apparatus and methods for testing electronic counting systems in which a sufficient eye comprehension interval between successive series of pulses from the transducer is accomplished without the necessity of utilizing a transducer gating signal or a counter gating means.

Still another feature of the present invention is to provide apparatus and methods for testing electronic counting systems utilizing only a single twisted pair cable between the transducer and the counter.

Another feature of the present invention is to provide apparatus and methods for testing electronic counting systems in which gating of the generated pulses to be counted is accomplished at the transducer end of the connecting cable.

Still another feature of the present invention is to provide apparatus and methods for testing electronic counting systems utilized in turbine meter calibration in which the output pulse frequency and magnitude parameters of the flowmeter for a particular fluid flow rate are measured and used in testing.

Still another feature of the present invention is to provide apparatus capable of measuring the output pulse frequency and magnitude of turbine flowmeters and adjusting the test pulse frequency and magnitude to coincide with the output pulse parameters for testing the counting systems utilized with turbine flowmeters.

BRIEF DESCRIPTION OF THE DRAWINGS

In order that the manner in which the foregoing and other features are attained in accordance with the invention can be understood in detail, particularly advantageous embodiments thereof will be described with reference to the accompanying drawings, which form a part of this specification.

DESCRIPTION OF THE PREFERRED EMBODIMENTS

Figure 1:
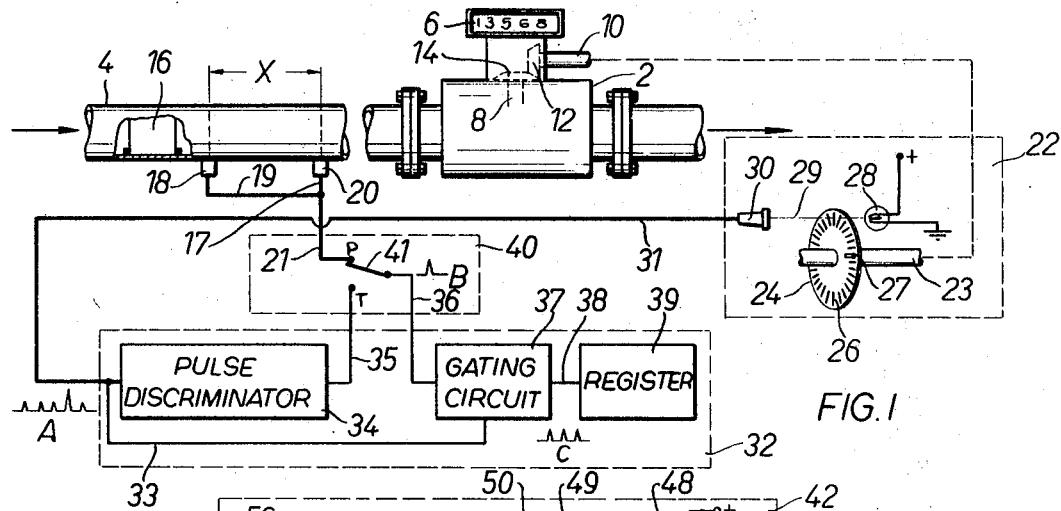
FIG. 1 is a plan schematic view of one embodiment of the invention shown performing testing of an electronic pulse transmission and counting system used in calibrating a conventional positive displacement flowmeter.

Referring now to FIG. 1, a typical positive displacement flowmeter 2 is shown in operable relation to a typical pipe prover section 4. Meter register 6 is driven by a shaft 8 turned by an internal driving mechanism not shown. Right-angle take-off (RATO) shaft 10 transmits the rotational motion of shaft 8 for external use. Bevel gear 12, attached to RATO shaft 10, is drivingly engaged with bevel gear 14, attached to shaft 8, and drives RATO shaft 10.

Pipe prover 4 has a calibrated section of pipe of known volume, indicated at X, a slug 16 sealingly inserted within the pipe for being moved through the calibrated length by the pressure of the fluid. As slug 16 moves through pipe it successively contacts and closes detector switches 18 and 20. Detector switch 18 is connected via interconnecting cables 19 and 21 to the "prover" (P) contact of two-position switch 40. Detected switch 20 is connected by interconnecting cable section 17 to cable 21.

RATO shaft 10 is operably connected to shaft 23 of a photoelectric rotary transducer 22 comprising opaque disc 24. Disc 24 has a predetermined number of translucent windows or slots 26 equally spaced around its periphery and adjacent the edge thereof, one of the windows 27 having a larger area than the other windows. The rotation of RATO shaft 10 drives shaft 23 and disc 24, rotating slotted windows 26 between incident light source 28 and photocell 30, and allowing a series of light beams 29 of substantially equal intensity to impinge on photocell 30 which produces electrical pulses in response thereto. As slotted window 27 passes between light source 28 and photocell 30, a beam of light of greater intensity impinges on photocell 30 and produces an electrical pulse of greater magnitude than the pulses produced by slots 26.

The series of intermittent electrical pulses from photocell 30, shown at A in FIG. 1, are applied via interconnecting cable 31 to the input of a conventional pulse discriminator circuit 34 of electronic counter 32, and via conductor 33 to gating circuit 37. Gating circuit 37 may conveniently be any conventional gating circuit that changes state to allow or stop the passage of electrical signals in response to a gating control signal, such as a bistable multivibrator. Discriminator circuit 34 senses the greater magnitude of the one pulse produced by window 27 of rotating disc 24, and produces an output pulse applied via wire 35 to the "test" (T) contact of switch 40.

In calibrating flowmeter 2, a measured quantity of fluid is passed through prover 4 to actuate meter 2 and register the quantity of fluid transferred by meter register 6. Register 6 is a mechanical register whose inherent accuracy is limited since it can generally be read only to the nearest $1/10$ barrel and may at best be interpolated to $1/100$ barrel. To more accurately reflect the precise degree of rotation of shaft 8 of meter 2, it is more common to utilize a rotating transducer 22, producing typically 1000 pulses per revolution. Using such a transducer and an electronic counter 32, flowmeter 2 may be read to the nearest $1/1000$ of a barrel.

With contactor 41 of switch 40 in the "P" position and oil passing through prover 4, slug 16 will contact and close detector switch 18 and apply a gating pulse, shown at B in FIG. 1, through cables 19 and 21, contactor 41 of switch 40 and conductor 36 to the trigger input of gate 37. Gate 37 controls the flow of electrical pulses from transducer 22 to counter register 39 via conductor 38. When detector switch 18 is closed gate 37 is "opened" and the repetitive series of electrical pulses, shown at A in FIG. 1, pass through gate 37 and conductor 38 to register 39 where they are totaled. When slug 16 traverses distance X it will close detector switch 20 and apply another gating pulse, as shown at B in FIG. 1, to gate 37 which then changes state and is "closed," preventing the passage of electrical pulses from transducer 22 to register 39. The number of pulses counted is indicative of the total degree of rotation of RATO shaft 10, and hence of shaft 8, while a measured quantity to oil is passing through prover 4. The quantity metered is then checked against the known quantity of oil passed through the distance X of pipe prover 4. Several "runs" of this type are made and the results are averaged. The meter can then be adjusted to reflect the correct average quantity of oil transferred, or a meter factor can be calculated that must be applied to all meter readings to give corrected readings.

It is desirable that the electronic counting system provide readings which are correct within plus or minus a predetermined number of pulses per each run of the meter calibration test. In addition, each run of the calibration test should result in a registered count close to the average of all of the runs. If the counter registers more than the predetermined number of counts above or below the average, a malfunction on the part of the prover, flowmeter or the electrical counting system is indicated.

To test the electronic counting system, switch 40 is placed in the T position, disabling detector switches 18 and 20 of pipe prover 4, and allowing the discriminator pulse from the discriminator 34 to be applied through conductor 35 to switch contactor 41. The discriminator pulse is then applied as a gating pulse, as shown at B in FIG. 1, via conductor 36 to the trigger input of gate 37.

Gate 37 is triggered to successive states by gating pulses applied from pulse discriminator 34. Assuming, as earlier discussed, that transducer disc 24 has 1000 windows or slots 26, counter 32 should register 1000 counts each time period that gate 37 is "open." It can be seen that gate 37 will be "open" for one revolution of transducer disc 24 until the one pulse of greater magnitude is detected by discriminator 34 producing the next gating control pulse which "closes" gate 37. If transducer 22 continues rotating register 39 will continue to accumulate 1000 counts during every alternate revolution of disc 24. The period of time during which gate 37 is "closed," and no counts are registered by register 39, is sufficiently long to enable the operator to read the total number of counts registered for the previous revolution of transducer disc 24. If the registered count varies by more than the predetermined number of counts above or below 1000, then a malfunction in the counting system is indicated and appropriate troubleshooting procedures can be followed to discover the cause. If the registered count varies by only the predetermined number of counts or less above or below 1000, then the counting system and associated circuitry is functioning properly.

Utilizing a photoelectric transducer 22 as described above and located at the flowmeter site remote from counter 32, it can be seen that only two twisted-pair cables are necessary to transmit all necessary pulse information from the flowmeter site to the counter site. With systems commonly employed today, three such cables are necessary to transmit the necessary information since the "gating" signals are produced by a separate means within the rotary tranducer and transmitted via a separate circuit to the counter. In addition, the elimination of a separate gating means, mechanical or electrical, in the rotary transducer to produce the gating control signal eliminates another source of malfunction and equipment failure.

Figure 2:
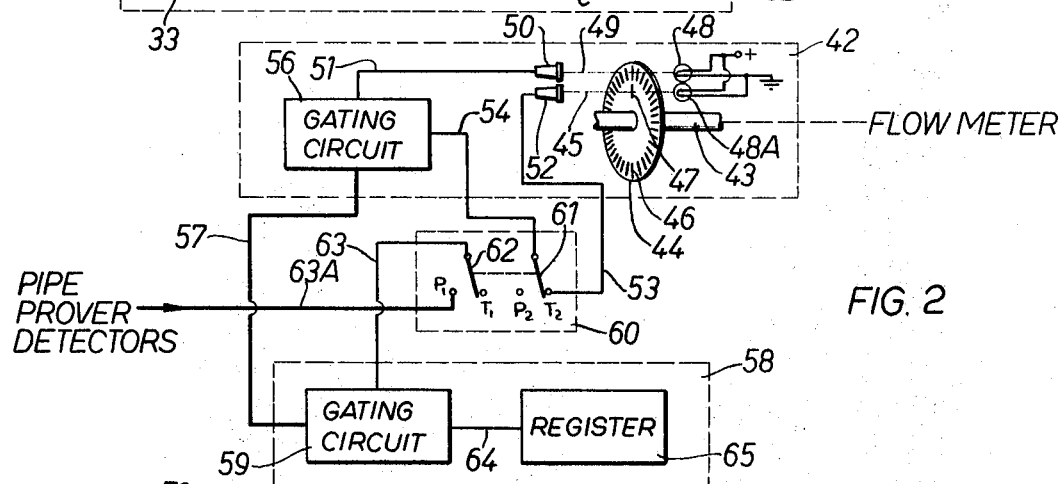
FIG. 2 is a schematic view of another embodiment of the invention shown performing system testing of an electronic counting system wherein the pulse gating means is associated with the transducer.

Another embodiment of this invention is shown in FIG. 2. Shaft 43 of photoelectric transducer 42 is driven by means of a mechanical linkage to RATO shaft 10 of a flowmeter, not shown. Mounted for rotational movement on shaft 43 is opaque disc 44 having a predetermined number of radial translucent windows or slots 46 evenly spaced about the periphery of the disc and adjacent the edge. One additional window or slot 47 is spaced inwardly from the outer band of slots 46 and is aligned radially with one of the slots in the outer band. Disc 44, driven by shaft 43 rotates between two incident light sources 48 and 48A on one side of disc 44, and two photocells 50 and 52 on the other side. A series of beams of light 49 of substantially equal intensity impinge upon photocell 50 from a first light source 48 as the slotted disc 44 interrupts the light beam from that source. The repetitive series of electrical pulses of substantially equal magnitude generated by photocell 50 are applied as an input to gate 56 via conductor 51. Gate 56 may conveniently be any conventional gating circuit that changes state to allow or stop the passage of electrical signals in response to a gating signal, such as a bistable multivibrator.

Once per revolution of disc 44, a light beam 45 impinges upon photocell 52 from the second light source 48A. The electrical pulse generated by photocell 52 is applied through conductor 53 to the "Test 2" (T2) contact of two-position switch 60. With switch 60 in the T position, the electrical pulse from photocell 52 is applied as a gating pulse through switch contactor 61 and conductor 54 to the trigger input of gate 56. The gating pulse causes bistable gate 56 to change state as earlier described, thus gating the repetitive series of electrical pulses from photocell 50 once every revolution of disc 44.

The output of gate 56 is applied via interconnecting cable 57 to gate 59 of electronic counter 58. Gate 59 can conveniently be a gating circuit as previously described for gate 56. When switch 60 is in the T position, no trigger inputs from the pipe prover detectors are applied to gate 59 through cable 63A, switch contactor 62 and conductor 63, and gate 59 remains "open" throughout the test procedure. With gate 59 "open," the series of pulses from gate 56 are applied through gate 59 and conductor 64 to register 65 for totaling. Gate 56 controls the repetitive series of electrical pulses from photocell 50 to counter 58. With gate 56 as a component of photoelectric transducer 42, as shown in FIG. 2, and located in the vicinity of the flowmeter, and gate 59 as a component of counter 58 at the remote end of interconnecting cable 57, only one twisted-pair cable is necessary between the transducer and counter. Customarily, two pairs of conductors are necessary, one for the repetitive series of pulses and one to carry the gating control signal. The embodiment shown in FIG. 2 and described above eliminates one-half of the necessary interconnecting cabling between the transducer and counter and allows the counter to remain gated open throughout the test. Thus, if a malfunction occurs in the circuit between the output of gate 56 and the input to counter 58, or a stray pulse is induced in conductors 57 or 64, register 65 will reflect any deviation from the normal predetermined count. This is a decided advantage since the counter "sees" all of the connecting cabling during the system check and is not "gated closed" fifty percent of the time as is commonly the practice with test systems that gate the counter at the counter site.

Figure 3:
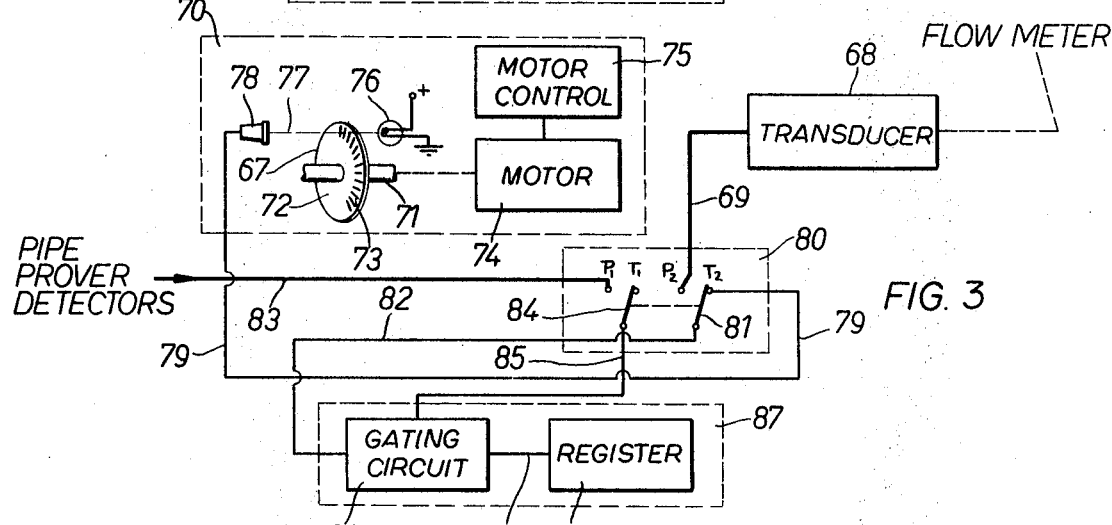
FIG. 3 is a schematic view of yet another embodiment of the invention utilizing a transducer generating a series of pulses with each series separated by a predetermined interval of time.

Another embodiment of the present invention is shown in FIG. 3. For utilizing a counter 87 with a pipe prover in flowmeter calibration, a typical 1000 pulse photoelectric rotary transducer 68 is employed to generate the necessary pulses for counting during the calibration run. The repetitive series of pulses generated by transducer 68 are applied through interconnecting cable 69 to the "Prover 2" (P2) contact of the ganged two-position switch 80. With switch 80 in the P position the transducer pulses would be applied from P2 through switch contactor 81 and conductor 82 to a conventional gating circuit 86 of counter 87. The pipe prover detector switch outputs would be applied via interconnecting cable 83, switch contactor 84 and conductor 85 as the trigger input to gate 86 to control the pulses to the counter register 89 during the calibration run.

During the counter system check, photoelectric rotary transducer 70 would be employed. Shaft 71 rotates opaque disc 67 having a predetermined number of translucent windows or slots spaced radially about a first portion of the periphery of the disc and adjacent the outer edge leaving a second portion of the disc 72 blank. Shaft 71 is rotatably driven by motor 74, the speed of which can be adjusted by speed control 75, which can be any conventional motor speed control rheostat. As described in previous embodiments, windows or slots 73 of disc 67 interrupt the incident light beam 77 from light source 76 impinging upon photocell 78. Photocell 78 generates a series of discrete electrical pulses of substantially equal magnitude in response to the impinging light beams 77. The pulse output of photocell 78 is applied via conductor 79 to terminal "Test 2" (T2) of switch 80.

Since slots 73 do not extend around the entire periphery of disc 67, transducer 70 will produce a series or burst of pulses of predetermined number during a first period of the revolution of disc 67, and no pulses during a second or remaining period of the revolution of disc 67. The output of transducer 70 will be a series or burst of pulses of predetermined number followed by a period during which no pulses are generated as disc 67 makes one revolution. For every revolution of disc 67 the same sequence will be repeated. By controlling the speed of motor 74, the time period during which no pulses are generated can accordingly be varied for purposes to be discussed later.

With switch 80 in the T position for counter system testing, the series of pulses from transducer 70 are applied from terminal T2 through switch contactor 81 and conductor 82 to the input of gate 86 which is "open" when switch 80 is in the T position. With gate 86 "open" the burst of pulses from transducer 70 is applied via conductor 88 to counter register 89 for totaling. The counter register will alternately count the burst of pulses, pause while no pulses are generated, count the next burst of pulses, pause again and continue to repeat the cycle. Transducer 70 will most advantageously generate a burst of pulses consisting of some multiple of ten, preferably 100 or 1000. As disc 67 of transducer 70 makes one revolution, the counter should register the total number of counts plus or minus a predetermined number of counts. The pause of the register during the second period of rotation of disc 67 during which no pulses are generated enables the operator to see the total number of pulses counted. Without a pause, the register would be a blur of numbers and no finite total could be read. As previously discussed, the speed of rotation of disc 67 can be varied, thereby varying the time period of the pause when no pulses are generated so that the time period is at least 1/10 of a second, the minimum time period necessary for the human eye to respond to the lack of movement and read the registered counts. The speed of motor 74 can be adjusted so that the operator can conveniently read the registered counts during the pause when no pulses are generated.

The pause replaces the gating function during the test procedures and allows gate 86, necessary in "gating" counter 87 during calibration, to remain open throughout the test, insuring that any malfunction of equipment or any stray signals will be counted, thus more accurately reflecting the actual performance of the counting system. Additionally, "gating" of counter 87 for noting total counts by the operator is accomplished without the need for an additional gating circuit, and only one twisted-pair cable is necessary to interconnect the transducer and the counter, saving the expense of additional cabling and lowering significantly the quantity of cabling available to pick up stray electrical pulses. The latter greatly adds to the reliability of performance of the electronic counting system.

If the count at each pause varies by more than the predetermined number of counts above or below the number of known pulses generated by the transducer 70, there is a malfunction in the counting system, or stray pulses are being induced in the cabling between transducer 70 and counter 87 and appropriate maintenance and troubleshooting procedures may be followed to correct the defect.

Figure 4:
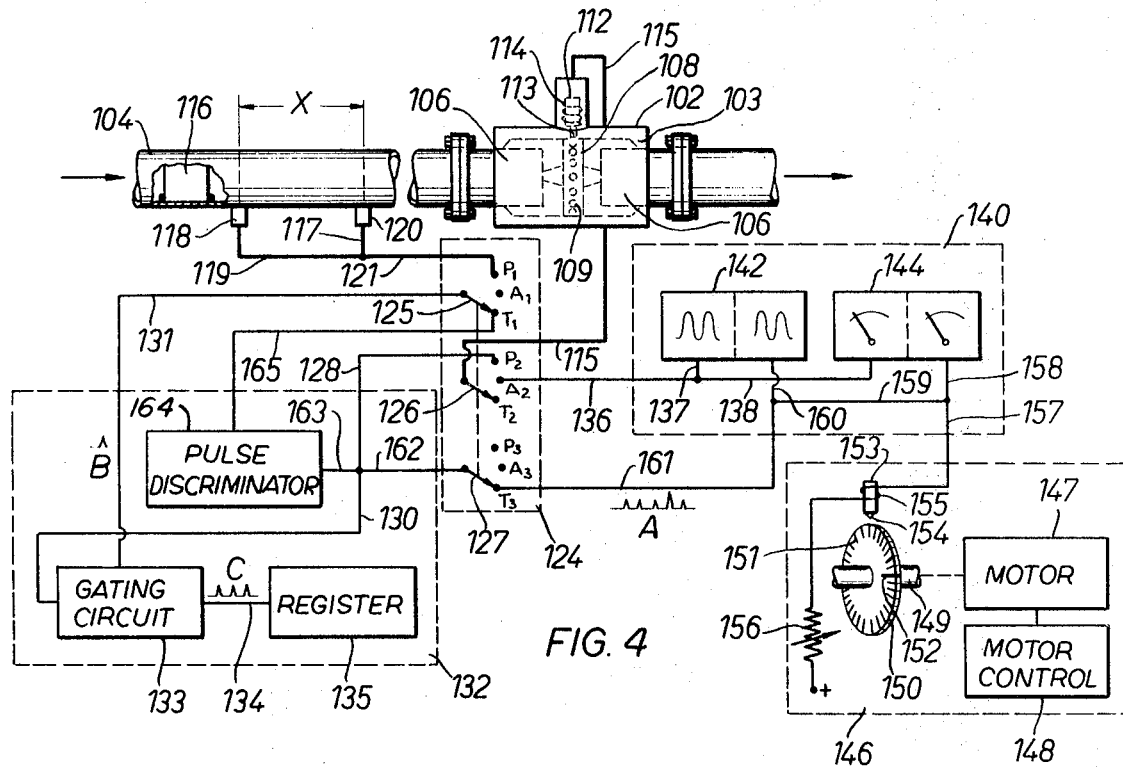
FIG. 4 is a plan schematic view of an embodiment of the invention shown performing system testing of an electronic pulse transmission and counting system used in calibrating a turbine flowmeter.

A plan schematic view of a typical turbine flowmeter 102 and a section of pipe prover 104 with associated electronic counter circuitry is shown in FIG. 4. Turbine flowmeter 102 comprises a chamber section 103 connecting spaced apart pipe sections 106. Turbine motor 108 axially mounted between the spaced apart ends of pipes 106 so that the flow of fluid through pipes 106 acting against turbine rotor 108 causes it to rotate. Rotor 108, constructed of ferrous metal, has a predetermined number of perforations or indentations 109 spaced evenly around the periphery of its outer rim. Mounted in one wall of section 103 is a magnetic sensor 112. Magnetic sensor 112 comprises an insulated wire coil 114 surrounding a ferrous metal core, one end 113 of which is exposed and chisel-shaped. End 113 is positioned adjacent the rotating rim of turbine rotor 108, with the long edge of end 113 perpendicular to the direction of movement of the run. When a voltage is impressed across coil 114 a magnetic flux field is created around the metal core and its end 113. Alternatively, a permanent magnet may be used as a sensor to achieve the same function and result. As the perforated or indented rim of turbine wheel 108 rotates by the chisel-shaped end 113 of the metal core, the magnetic flux field is regularly varied in response to the indentations and perforations causing a regular sequence of electrical pulses to be induced in coil 114 and applied through interconnecting cable 115 to switch contactor 126 of three-position switch 124. It can be seen that the magnitude and frequency of the pulses induced in coil 114 will vary according to the speed of rotation of turbine rotor 108 which in turn is dependent upon the fluid flow rate through meter 102.

Pipe prover section 104 operates in the identical manner as the pipe prover discussed above. When slug 116 contacts and closes detector switch 118, an electrical pulse is applied via interconnecting cable sections 119 and 121 to the "Prover 1" (P1) contact of switch 124. With switch 124 in the P position, magnetic detector pulses are applied through switch contactor 126 and conductors 128, 129 and 130 to gate 133 of electronic counter 132. Gate 133 can conveniently be the same type of gate as previously discussed in prior embodiments.

The prover detector pulse is applied through switch contactor 125 and conductor 131 to the trigger input of gate 133. Gate 133 is "open" and allows the magnetic detector pulses to be applied through conductor 134 to counter register 135. Register 135 counts the pulses received through gate 133 until slug 116 contacts and closes detector switch 120, generating a second detector pulse applied through interconnecting cable sections 117 and 121, switch contactor 125 and conductor 131 to gate 133. Gate 133 is then "closed" and blocks succeeding magnetic detector pulses from passing to counter register 135. The count in register 135 is functionally related to the total number of revolutions of turbine rotor 108 while a known volume of fluid has passed through the calibrated volume of pipe prover 104, indicated as X in FIG. 4. Adjustment of the turbine meter or calculation of meter factor is performed as previously described.

The problems of testing turbine flowmeters is solved by the embodiment of the present invention shown in FIG. 4. The apparatus shown in FIG. 4 provides a variable speed magnetic transducer 146 and an adjusting unit 140 to adjust the output pulses of magnetic transducer 146 to coincide in pulse frequency and magnitude with the pulses generated by magnetic detector 112 of meter 102.

With switch 124 in the "Adjust" (A) position, pulses from magnetic sensor 112 are applied through cable 115, switch contactor 126 and conductors 136 and 137 to a first input of dual-trace cathode ray tube (CRT) 142, and through conductor 138 to one input of a first frequency indicator 144. Magnetic transducer 146 has a motor 147 and motor control 148 driving a shaft 149 upon which is rotatably mounted a disc of ferrous metal 150. The metal disc has a predetermined number of slots 151 spaced around its outer periphery and extending radially inwardly from the edge. One of the slots 152 is larger than the remaining slots for a purpose to hereinafter be explained.

Sensor 153 has an insulated wire coil 155 wrapped around a ferrous metal core having a chisel pointed tip 154 exposed from coil 155 and positioned adjacent the slotted edge of disc 150, with the long edge of tip 154 perpendicular to the movement of the rim. One end of coil 155 is connected by conductors 157 and 158 to a second frequency indicator 144, by conductors 159 and 160 to a second input of dual-trace CRT 142, and by conductor 161 to the "Test 3" (T3) contact of switch 124.

To adjust the frequency of the pulses generated by magnetic transducer 146, the speed of motor 147 is varied by adjusting speed control 148, which can be any conventional motor speed control rheostat, to change the speed of rotation of disc 150 and thus vary the frequency of the pulses induced in wire coil 155. Motor control 148 is adjusted until the frequency of the series of pulses produced by magnetic transducer 146 coincides with the frequency of the series of pulses produced by magnetic sensor 112 as shown by dual-frequency indicator 144. The pulse magnitude of the series of pulses generated by transducer 146 is adjusted by varying control 156. Adjustment is continued until the pulse magnitude coincides with the pulse magnitude of the pulses generated by magnetic sensor 112 as displayed on dual-trace CRT 142. When the frequency and magnitude of the two series of pulses coincide, transducer 146 is adjusted to produce a series of pulses that reflect the operation of turbine meter 102 for the particular flow rate at which the meter is being calibrated.

To test the electronic counting system, switch 124 is placed in the T position and the transducer pulses applied to contact T3 of switch 124 are applied via contactor 127 and conductors 162 and 130 to gate 133 of counter 132, and via conductors 162 and 163 to the input of pulse discriminator 164. Pulse discriminator 164 can be of any conventional discriminator circuit design.

As previously mentioned, disc 150 of transducer 146 has one slot 152 that is larger than the remaining slots 151. The larger slot causes a greater variation in the magnetic flux field adjacent the end 154 of detector 153 and induces a pulse of greater magnitude in coil 155. This pulse of greater magnitude occurs only one time per each revolution of disc 150 and marks the beginning and end of the predetermined number of pulses. A portion of the repetitive series of pulses generated by transducer 146, including the one pulse of greater magnitude, is shown at A in FIG. 4.

Discriminator 164 detects the one pulse of greater magnitude and produces an output pulse in response thereto, as shown in FIG. 4 at B, and applies the pulse via conductor 165, switch contactor 125 and conductor 131 to the trigger input of gate 133. The control pulses applied to gate 133 function to successively "open" and "close" gate 133 and pass or block the series of pulses generated by transducer 146 as previously described in other embodiments. The counter will register the applied pulses during every other revolution of disc 150, the pause during alternate revolutions providing the operator with sufficient time to take the register reading and determine the performance of the electronic counting system in the manner previously described.

The above described embodiment provides an apparatus and method for reliably testing an electronic counting system used for calibrating a turbine flowmeter utilizing the flow rate parameters of the meter during the tests. Further, the need for a separate circuit to generate and transmit discrete gating pulses is eliminated, thus reducing the hazard of stray pulses inadvertently gating the counter and providing erroneous pulse counts. The need for another twisted-pair cable to carry such pulses is also eliminated.

Of course, this embodiment is not restricted to testing magnetic type turbine flowmeters but can be utilized to test any transmission line carrying a repetitive series of pulses with which the output pulses of transducer 146 can be adjusted to coincide. It is not necessary that transducer 146 be a magnetic transducer, since it will be apparent to those skilled in the art that various other types of transducers may be employed, such as photoelectric, Hall effect and radioactive contactor to name a few, without departing from the scope of the invention disclosed herein. Further, any convenient means for indicating and comparing the turbine flowmeter detector output and the magnetic test transducer output may be utilized in place of the dual-frequency meter and dual-trace CRT.

Figure 5:
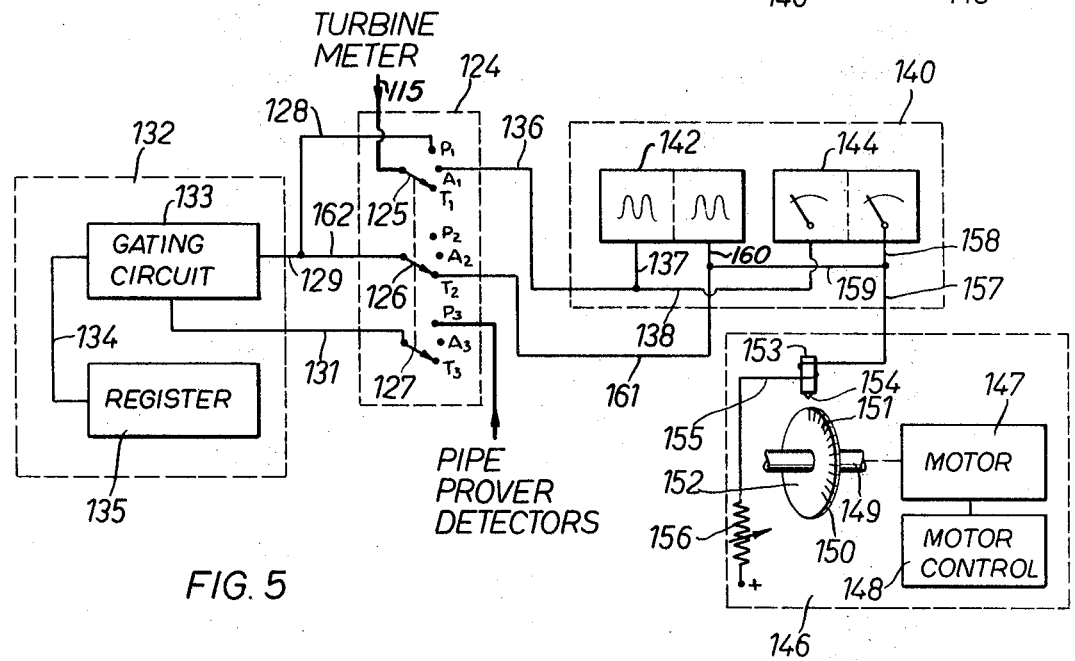
FIG. 5 is a schematic view of another embodiment of the invention utilized in testing a counting system employed in calibrating turbine flowmeters employing a transducer generating a series of pulses with each series separated by a predetermined interval.

The embodiment shown in FIG. 5 utilizes a transducer that provides a repetitive series of pulses of predetermined number during a first period and no pulses during a second period as described for the embodiment shown in FIG. 3. However, the embodiment shown in FIG. 5 utilizes a magnetic transducer rather than the photoelectric transducer as shown in FIG. 3 although either could be utilized to achieve the same result.

Magnetic transducer 146 is similar to the transducer described in the embodiment shown in FIG. 4 in that it has a motor 148 with motor control 147 to rotatably drive shaft 149 having a disc 150 of ferrous metal rotatably mounted thereon. Disc 150 has a series of slots 151 of predetermined number radially spaced about a first portion of its periphery. The remaining second portion 152 of the periphery of disc 150 is unslotted. Magnetic sensor 153 functions in the identical manner as the magnetic sensor previously described and shown in FIG. 4. As disc 150 rotates and the first portion of its periphery containing slots 151 pass adjacent sensor 153, a series or burst of pulses of predetermined number are generated and are applied through conductors 157 and 158 to one input of dual-frequency indicator 144 and conductors 159 and 160 to one input of dual-trace CRT 142 of adjusting unit 140, and through conductor 161 to contact "Test 2" (T2) of three-position switch 124. No pulses are generated during the second portion 152 of the rotation of disc 150, but pulse generation resumes when the first portion of disc 150 having slots 151 again repetitively disrupts the magnetic-flux field created by sensor 153.

With switch 124 in the "Adjust" (A) position, the series of pulses from the magnetic sensor of the turbine flowmeter are applied through cable 115, switch contactor 125, conductors 136 and 137 to the other input of dual-trace CRT 142, and through conductor 138 to the other input of dual frequency indicator 144. Adjustment of the frequency and pulse magnitude of the burst of pulses generated by transducer 146 is performed in the same manner as the adjustment described in the embodiment of FIG. 4.

Once adjustment of the frequency and magnitude of the pulses generated by transducer 146 has been accomplished, switch 124 is set to the T position to test the electronic counting system. The burst of pulses present at contact T2 of switch 124 is applied through contactor 126 and conductors 162 and 129 to gate 133 of counter 132. During system testing, gate 133 is continuously "open" and the series of pulses from transducer 146 are applied directly to counter register 135 for totaling. The registering of the series of pulses by the counter and the pause while no pulses are counted to give the operator an opportunity to read the last total registered is accomplished in the same manner as hereinbefore described.

As earlier discussed, the embodiments of FIGS. 4 and 5 may be employed with various types of turbine flowmeters and transmission lines carrying a repetitive series of pulses. Of course, the magnetic test transducers shown in FIGS. 4 and 5 are not restricted to having slots in the periphery of the rotating metal disc as any other type of serrated edge that performs the same function is included within the scope of this invention. Similarly any means for comparing the frequency and magnitude of the known pulses and the test pulses may be employed without departing from the scope of this invention.

While advantageous embodiments have been chosen to illustrate the invention, it will be understood by those skilled in the art that various changes and modifications can be made therein without departing from the scope of the invention as defined in the following claims.

What is claimed is:

1. Apparatus for testing an electrical pulse counter, comprising:
   a rotatable disc having a predetermined number of radial slots disposed about the edge of said disc, one of said slots being substantially larger than the remainder of said slots,
   means for rotating said disc,
   signal producing means cooperating with said rotatable disc and said slots therein for generating a predetermined number of electrical pulses for each revolution of said disc, said one slot of substantially larger size generating one electrical pulse of substantially greater magnitude than the other of said pulses,
   pulse discriminating means connected to said signal producing means for detecting said one pulse of substantially greater magnitude and generating a control pulse in response thereto for indicating the completion of said predetermined number of electrical pulses and one revolution of said disc,
   gating means having a signal input, a signal output and a control input,
   means for connecting said gating means signal input to said signal producing means,
   means for connecting said gating means signal output to the electrical pulse counter to be tested, and
   means for applying said control pulses to said gating means control input, said gating means responsive to said control pulses for passing said electrical pulses generated by said signal producing means to the electrical pulse counter during alternate intervals between said control pulses.

2. The apparatus as described in claim 1, wherein said signal producing means comprises:
   means for producing a beam of light directed normal to one surface of said disc and aligned with said slots, to alternately pass and block said beam of light for producing a plurality of light beams of predetermined number equal to the number of said slots, the light beam passing through said one substantially larger slot being of a greater intensity than the other of said plurality of light beams, and
   a photo electric cell for receiving said plurality of light beams and said one beam of greater intensity for generating a series of electrical pulses of predetermined number, including one pulse of substantially greater magnitude.

3. The apparatus as described in claim 1, wherein said slots in said disc communicate with the outer rim of said disc.

4. The apparatus as described in claim 3, wherein said signal producing means comprises:
   means for generating a magnetic flux field radially adjacent and closely spaced to the rim of said disc, said slotted rim of said disc operating to disrupt said flux field a predetermined number of times equal to the number of said slots, said one slot of substantially larger size causing a flux field disruption of substantially greater magnitude, and
   means for detecting said disruptions in said magnetic flux field and generating a series of electrical pulses of predetermined number, including one pulse of substantially greater magnitude.

5. The apparatus as described in claim 1, including:
   means for varying the speed of said rotatable disc for varying the frequency of said plurality of light beams and said generated series of electrical pulses, and
   means for cooperating with said signal producing means for adjusting the magnitude of said generated electrical pulses.

6. The apparatus as described in claim 5, including:
   means for indicating the frequency and magnitude of said series of generated electrical pulses.

References Cited

UNITED STATES PATENTS

| | | | |
|---|---|---|---|
| 3,024,986 | 3/1962 | Strianese | 250—233 |
| 3,155,939 | 11/1964 | Vadus | 235—153 |
| 3,426,273 | 2/1969 | Kuntz | 324—68 |

OTHER REFERENCES

E. Bukstein: Industrial Electronics Measurement and Control, September 1961, pp. I–III, 63–73.

RUDOLPH V. ROLINEC, Primary Examiner

M. J. LYNCH, Assistant Examiner

U.S. Cl. X.R.

73—1, 3; 235—153; 340—146.1